UNITED STATES PATENT OFFICE.

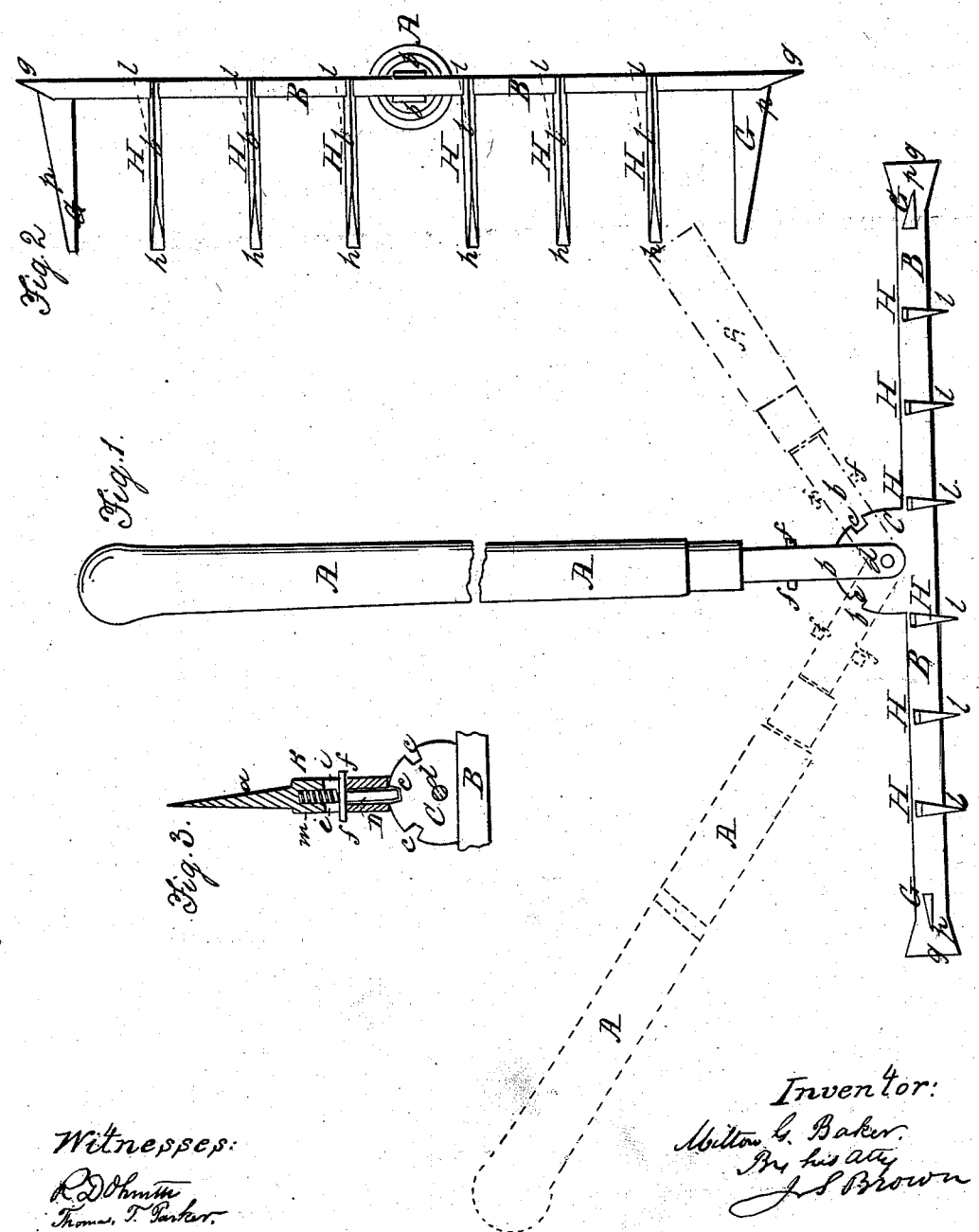

MILTON G. BAKER, OF NEW BURLINGTON, OHIO.

IMPROVEMENT IN GARDEN-RAKES.

Specification forming part of Letters Patent No. 57,066, dated August 14, 1866.

*To all whom it may concern:*

Be it known that I, MILTON G. BAKER, of New Burlington, in the county of Clinton and State of Ohio, have invented a new and Improved Garden Rake and Cultivator; and I do hereby declare that the following is a full and exact description thereof, reference being had to the accompanying drawings, making part of this specification.

Figure 1 is an under-side view of the rake; Fig. 2, a lower-end view thereof; Fig. 3, a section of the shank, and showing the peculiar connection between the handle and the head of the rake.

Like letters designate corresponding parts in all of the figures.

The main feature of my invention consists in pivoting or jointing the handle to the head of the rake in such a manner that it may be set at right angles thereto, as in the ordinary rake, or to any desired oblique angle thereto, and either way from the perpendicular.

The subordinate features of the invention relate particularly to the new uses to which the instrument is applicable with the main improvement, as hereinafter specified.

The handle A has preferably a forked shank, *b*, and the head B has a semicircular or equivalent form of projection or boss, C, at its middle, to which the shank *b*, forked or otherwise, is pivoted at *d*. This allows the handle to swing around to any desired angle with the rake-head; but since it is neither required nor desirable to hold the handle at many angles to the head, and it is necessary that where it is retained it should be held firmly, I provide for locking it in three or more positions, particularly in the ordinary right-angled position, as in the full drawing, Fig. 1, and in the two positions indicated, respectively, by the dotted and the red lines in the same figure. Different means may be employed for the purpose, so, also, as to enable the handle to be readily shifted from one position to another. For this purpose the arrangement represented in the drawings is substantial and convenient.

The edge of the boss C is concentric with the pivot *d*, and a certain number of notches, *c c c*, are made therein in the proper positions, as shown. A catch, D, located in or on the shank *b*, is made to enter these notches, and thereby hold the handle in the position required.

A spring, *m*, is employed to force and retain the catch in the notches, and the catch is drawn out of the notches by raising the projections *f f* thereof, there being a slot, *i*, Fig. 3, in the shank, to allow and limit the extent of movement to be given to the catch, all substantially as shown.

The handle and rake-head being thus connected, the main position shown is the one employed as usual for ordinary raking; but by putting the handle into either of the oblique positions indicated by dotted and red lines in Fig. 1, and shoving the rake-head endwise while it is in a horizontal position, or nearly so, it is made to eradicate weeds and cultivate the ground finely, and is especially applicable to cultivating between the close rows of garden vegetables.

In order to adapt the rake to its use as a cultivator without detracting from its utility as a rake, I make some improvements in the form and position of the rake-head and rake-teeth: First, the head B has its ends *g g* widened and sharpened, as shown, so as to cut through the ground and more easily remove the weeds in moving endwise for cultivating; second, the two outer teeth, G G, are set flatwise in a position parallel with the head B, and their outer edges, *p p*, are sharpened so as to cut the ground and the weeds in cultivating close to the plants; third, the other teeth, H H, are of similar flattened form, but have their position transverse to the head B and sharpened edges *l l* downward, substantially as shown. In this form they are more effectual for stirring and pulverizing the earth.

The ends *h h* of the teeth of the rake are sharpened, as shown, for the purpose of raking.

What I claim as my invention, and desire to secure by Letters Patent, is—

1. Pivoting or jointing the handle A to the head B of a garden-rake, substantially as and for the purposes herein specified.

2. The flattened and sharpened ends of the head B, for the purpose set forth.

3. The peculiar construction and arrangement of the two outer teeth, G G, for the purpose set forth.

4. The construction and arrangement of the middle teeth, H H, for the purpose specified.

The above specification of my improved garden-rake signed by me.

M. G. BAKER.

Witnesses:
SAMUEL LEMAR,
J. F. HAMILTON.